Feb. 11, 1964 D. L. BABCOCK ETAL 3,120,781
MOTION PICTURE CAMERA WITH DRIVE MEANS
CONTROLLED BY FILM CASSETTE
Filed Aug. 8, 1960

DAVID L. BABCOCK
RICHARD P. FERRY
ROBERT A. KIRK
INVENTORS

BY R. Frank Smith

Steve W. Grembow
ATTORNEYS

United States Patent Office 3,120,781
Patented Feb. 11, 1964

3,120,781
MOTION PICTURE CAMERA WITH DRIVE MEANS CONTROLLED BY FILM CASSETTE
David L. Babcock, Richard P. Ferry, and Robert A. Kirk, Rochester, N.Y., assignors to Eastman Kodak Company, Rochester, N.Y., a corporation of New Jersey
Filed Aug. 8, 1960, Ser. No. 48,281
9 Claims. (Cl. 88—16)

This invention relates generally to cameras, and more specifically to an improved motion-picture camera in which the operation of the drive means is controlled by the film cassette.

The primary object of the present invention is to provide an improved motion-picture camera having an electric motor drive in which the operation of the drive motor is controlled by the film cassette.

Another object of the invention is the provision of an improved motor driven motion-picture camera in which the camera is automatically shut off after a single row of two possible rows of images is recorded on the film supply as it is exposed.

A further object of the invention is to provide an improved electric drive motion-picture camera in which the insertion of a film cassette therein sets a footage dial and closes a normally open cutoff switch in the circuit of the electric drive motor.

A still further object of the invention is to provide an improved electric drive motion-picture camera of simple design and construction, thoroughly reliable and efficient in operation, and economical to manufacture.

Objects and advantages other than those set forth above will be apparent from the following description when read in connection with the accompanying drawing, in which.

Figure 1:
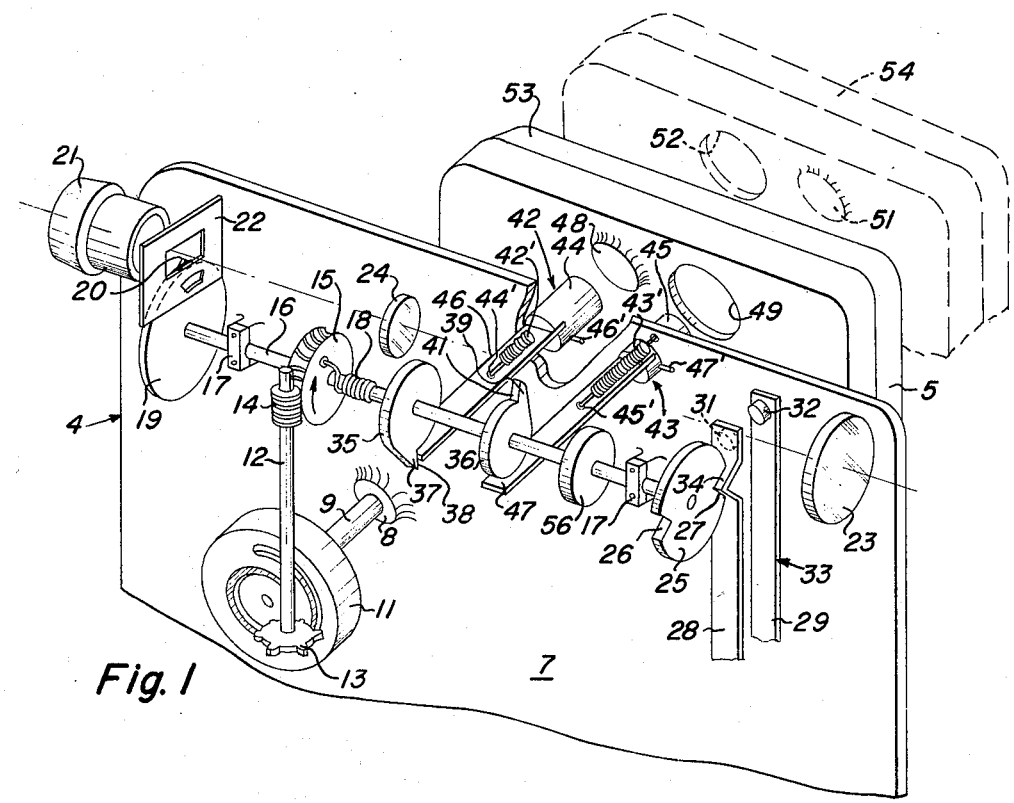
FIG. 1 is a fragmentary schematic view in perspective of a preferred embodiment of the motion-picture camera of this invention.

As shown in the drawing, this invention involves a motor driven motion-picture camera 4, shown schematically in FIG. 1, of the type utilizing a film cassette 5. In this camera, the insertion of film cassette 5 therein controls the operation of an electric drive motor 6, shown diagrammatically in FIG. 3. The film cassette 5 is in certain aspects similar to the normal type of cassette presently used in 8 mm. cameras in which the film contained therein is of a width sufficient to receive two rows of images side by side and is normally 25 feet long. When the cassette is inserted in the camera in one position, the operator can run off the full length of film exposing only one-half of the film to record a single row of images thereon. The operator may then remove the cassette and reinsert it into the camera after the cassette has been turned through an angle of 180°. It is then possible to run off the same 25 feet of film exposing the other half to record a second row of images inverted relatively to those in the other row. A film cassette of this general type is well known and one such cassette is disclosed in U.S. Patent 2,026,960.

Figure 3:
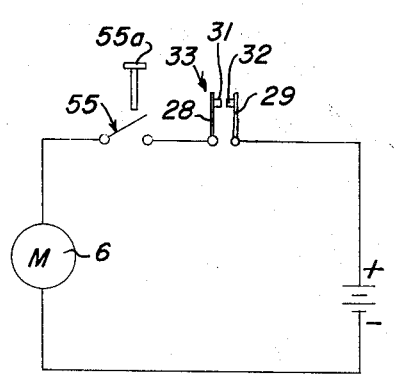
FIG. 3 is an electric wiring diagram for an electric motor driven camera.

As shown in FIG. 1, camera 4 has a vertical plate 7 having a boss 8 forming a bearing for rotatably supporting a shaft 9, one end of which has a spiral hoop gear 11 mounted thereon and the opposite end, not shown, drivingly connected to any suitable drive motor, shown diagrammatically in FIG. 3 as an electric motor 6 of any conventional type. A spindle 12 has a pinion 13 at one end driven by spiral hoop gear 11, and a worm 14 at the opposite end for driving a gear 15 loosely mounted on a shaft 16 journaled in bearings 17 fixed to plate 7. The gear 11, pinion 13, shaft 12 and worm 14 form a gear train connecting motor 6 to gear 15. A clutch spring 18 encircles shaft 16 and has one end secured to gear 15. The clutch spring 18 is of a well-known type wound in such a manner that when gear 15 is turned by motor 6 and the gear train in the direction indicated by the arrow in FIG. 1, it constricts and drivingly engages shaft 16, and when turned in the opposite direction merely rotates loosely about shaft 16. Consequently, if gear 15 is fixed or held stationary by the gear train, shaft 16 is free to rotate in the direction of the arrow of FIG. 1 if so turned. A circular footage dial disk 19 is mounted on one end of shaft 16 and the indicia thereon are viewable through an eyepiece 21 of a telescopic viewfinder, which includes a mask 22, and respective objective and erector lenses 23 and 24, and may be aligned with an index mark 20 carried by mask 22. The footage disk 19 is located in the rear focal plane of the viewfinder and is therefore in focus and always visible to the operator.

A cam disk 25 having diametrically opposed notches 26, 27 is fixedly mounted on shaft 16, and cooperates with a flexible spring blade 28 biased into engagement with the periphery of cam disk 25. A fixed blade 29 is mounted in opposed relation to flexible blade 28, and blades 28, 29 have respective contacts 31, 32 which form a switch 33 in the electric motor circuit that is openable and closable by cam disk 25. The flexible blade 28 has a projection 34 complementary to notches 26, 27 in cam disk 25, and when projection 34 bottoms in either notch, switch 33 is in an open position, as seen in FIG. 1. In any other position of cam disk 25, its periphery cams projection 34 outwardly urging contact 31 into engagement with contact 32 maintaining switch 33 in a closed position.

A pair of identically shaped, axially spaced reset cams 35, 36 are secured to shaft 16 and oriented with respect to one another so that a lug 37 and shoulder 38 formed by cam 35 are angularly spaced 180° from a lug 39 and shoulder 41 formed by cam 36. A pair of identical reciprocally movable plungers 42, 43 are provided having respective sensing elements in the form of cylindrical buttons 44, 45 at one end slidably carried by plate 7, and respective flexible blade portions 46, 47 each having one end inserted in a slot in its respective button and secured thereto, and the opposite end urged into engagement with the periphery of its complementary cams 35, 36. The plungers 42, 43 are normally biased toward cassette 5 by helical springs 42', 43' connected between plate 7 and respective pins 44', 45', and stop lugs 46', 47' carried by respective buttons 44, 45 limit the travel of plungers 42, 43 toward film cassette 5. The film cassette 5 has a surface irregularity such as a boss 48 and recess 49 on one side thereof, and an oppositely arranged surface irregularity, or boss 51 and recess 52 on the opposite side shown in phantom in FIG. 1. When film cassette 5, oriented as shown in full lines in FIG. 1 with its side 53 up, is inserted into camera 4 into an operative position as seen schematically in FIG. 1 for taking moving pictures, boss 48 and recess 49 are in register with respective buttons 44, 45 and boss 48 further cams button 44 outwardly causing the end of blade 46 which is in engagement with shoulder 38 of lug 37 to rotate cam 35 and shaft 16 through a predetermined number of degrees causing cam disk 25 to close switch 33. When film cassette 5 is removed from camera 4, rotated through an angle of 180° so that it is now oriented as shown in phantom in FIG. 1 with its opposite side 54 up, and inserted into camera 4 in an operative position for taking pictures, recess 52 is now in register with button 44 and boss 51 in register with button 45.

Figure 2:
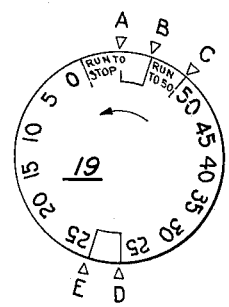
FIG. 2 is an elevation view of the footage dial.

The purpose of recesses 49 and 52 is to provide a safety feature to prevent the operator from running camera 4 if cassette 5 is inadvertently inserted therein incorrectly. When cassette 5 is correctly inserted in the camera, recess 49 is in register with button 45 and boss 48 engages and cams button 44. If cassette 5, however is incorrectly inserted with side 54 up as seen in phantom in FIG. 1, then recess 52 is in register with button 44 and cannot depress it. Consequently, switch 32 will remain open, and camera 4 will not operate upon depression of a camera operating control such as button 55a connected to a switch 55 shown schematically in FIG. 3. The operator will then realize his error, and will remove and correctly reinsert cassette 5. Shaft 16 further has a manual reset button 56 mounted thereon by which the operator may manually turn shaft 16 to position the footage dial line designated "A," in FIG. 2 in register with index mark 20 in the viewfinder to place camera 4 in the shut-off position. In this position, projection 34 bottoms in notch 27 and switch 33 is in an open position.

Although all motion-picture cameras have shutter, film transport, and film drive mechanisms of some suitable type incorporated therein, these mechanisms have been omitted from the drawing for purposes of clarity, and for the further reason that they do not form a part of the invention.

In describing the operation of this invention, let us assume initially that camera 4 is in the position shown in FIG. 1 with switch 33 open and footage dial 19 in a position with the line designated "A" in alignment with index mark 20 in the viewfinder. The camera 4 is then loaded by inserting film cassette 5 therein with side 53 uppermost, as shown in full lines in FIG. 1. As cassette 5 is moved into its operative position, boss 48 engages button 44 and cams it outwardly causing blade 46 to turn cam 35, shaft 16, footage dial 19, and disk 25 through a predetermined angle camming projection 34 out of notch 27 and closing switch 33. The camera 4 is now in a loaded position and ready for operation by the operator. To operate camera 4, the operator depresses the camera operating button 55a of known type which closes switch 55 shown in FIG. 3, thereby completing the circuit to electric motor 6 which is energized for actuating the shutter mechanism and transporting the film through camera 4 in a well-known manner. The electric motor 6 further drives the gear train 11, 13, 12 and 14, gear 15 and shaft 16 for turning footage dial 19 to indicate to the operator the number of feet of film that remains unexposed in cassette 5. The footage dial 19 upon insertion of cassette 5 into camera 4 is turned in a counterclockwise direction until the line designated "B" therein is in alignment with index mark 20. The operator then depresses the camera operating button 55a and advances the film in the cassette 5 to wind off the leader, and stops camera 4 when the line designated "C" of footage dial 19 is in alignment with index mark 20. The camera 4 is now in a position to take motion pictures, the line "C" indicating that there is 50 feet of film to be exposed. After 25 feet of film has been exposed, shaft 16 and disk 25 have been rotated by means of the drive mechanism through an angle of 180° so that projection 34 bottoms in notch 26 opening switch 33 in the electric motor circuit. At this point, even if the operator should depress the camera operating button 55a, camera 4 will not operate. Cam 36 is also turned 180° and during its travel its lug 39 engages and bends blade 47 out of the way, and when lug 39' passes the end of blade 47, it returns to its original position. The end of blade 47 is now behind and in register with shoulder 41 of lug 39. The operator then removes cassette 5 from camera 4, turns it clockwise or counterclockwise through an angle of 180° until side 54 is uppermost, as shown in phantom in FIG. 1, and then reinserts the film cassette into the camera into its operative position. In doing this, boss 51 engages and cams button 45 outwardly, and blade 47 which is in register with lug 39 turns cam 36, shaft 16, footage dial 19 and disk 25 through a predetermined angle sufficient to cam projection 34 out of notch 26 and close switch 33. At this point, the line designated "E" of footage dial is in alignment with index mark 20 and camera 4 is in position to run off the remaining 25 feet of film for exposing the other half or second row of images of the film upon depression of the camera operating button. When the line of the footage dial designating "0" foot is in register with index mark 20, the operator knows that the remaining 25 feet of film has been exposed. The operator then continues to run the film until projection 34 bottoms into notch 27 opening switch 33 and preventing further operation of camera 4. Lug 37 of cam 35 as it completes its revolution engages and bends blade 46 out of the way, and as it passes the end of blade 46, the blade returns to its original unflexed position as seen in FIG. 1, behind and in register with shoulder 38 of lug 37. At this point, the line of footage dial designated "A" is once again in alignment with index mark 20. The operator may then remove film cassette for processing, and camera 4 is in position to receive a new film cassette or the same cassette with a fresh spool of film therein.

The invention has been described in detail with particular reference to a preferred embodiment thereof, but it will be understood that variations and modifications can be effected within the spirit and scope of the invention described hereinabove and as defined in the appended claims.

We claim:

1. In a camera of the type having a chamber for receiving a reversible film cassette having a surface irregularity on each of a first side and a second side thereof, which cassette is selectively insertable into said chamber in respective first side and second side orientations, and film transport means for transporting film in the cassette, the combination comprising: a pair of sensing elements carried by the camera and movable to preselected positions, each of said elements being located for cooperation with a respective one of said surface irregularities to place the respective sensing element in its preselected position only upon the insertion of a film cassette into said chamber in the corresponding side orientation, and control means responsive to said sensing elements for disabling the film transport means except when either one of the said sensing elements occupies its respective preselected position.

2. The invention according to claim 1 wherein each of said sensing elements comprises a follower biased toward said cassette and movable by one of said surface irregularities upon proper insertion of said cassette in said camera, and a pair of movable reset cams connected to said control means, the said control means being responsive to either one of the reset cams and each of said reset cams being responsive to one of the said followers.

3. The invention according to claim 2 wherein each of said followers comprises a reciprocally movable plunger, each plunger having one end engageable by one of said surface irregularities and a leaf spring at the other end for moving its corresponding reset cam.

4. In a motion-picture camera of the type having a chamber for receiving a film cassette, the combination comprising: drive means for said camera including an electric motor; control means for said drive means including a switch in the circuit of said motor and movable between a closed position in which said drive means is in condition to operate, and a normal open position in which said drive means is disabled and an actuating means including a control cam for controlling the opening and closing of said switch and responsive to insertion of a film cassette into said chamber for moving said switch to said closed position.

5. The invention according to claim 4 wherein said control cam is a rotatable disk having a peripheral notch, and said switch includes a flexible control element having a projection urged into engagement with the periphery of said disk for opening said switch when said projection enters said notch.

6. In an improved motion-picture camera of the type having a chamber for receiving a reversible film cassette having a boss on each of two opposite sides thereof and a camera operating control adapted when actuated to cause the camera to transport film therethrough and expose same, the combination comprising: an electric drive motor for said camera, a rotatable shaft driven by said motor and supporting a circular disk secured thereto, said disk having diametrically opposed peripheral notches; a switch for said motor adapted when closed to connect electric power to said motor upon actuation of the camera operating control, and when opened to disconnect power therefrom, said switch further including a fixed contact element and a flexible contact element having a projection urged into engagement with the periphery of said disk, said disk adapted to urge said flexible contact element into engagement with said fixed contact element for closing said switch except when said projection enters said notches at which time said switch is opened; a pair of axially spaced, angularly movable reset cams mounted on said shaft, each of said cams having a lug, the cam lugs being angularly spaced 180° apart; a pair of reciprocally movable plungers each having a button at one end and a flexible blade at the other end in engagement with the periphery of one of said reset cams, said reset cams being angularly oriented with respect to said disk so that whenever said projection enters one of said notches, one of said blades is in alignment with and in position to engage one of said lugs; one of said buttons being laterally cammed by one of the bosses of a film cassette when the cassette is inserted into said chamber, the one said button urging one of said plungers, reset cams, and the shaft and disk through an angle sufficient to cause said disk to urge said projection out of one of said notches and said flexible contact into engagement with said fixed contact whereby said camera is in position to operate upon actuation of said camera operating control until said projection enters said other notch opening said switch and preventing further camera operation; and the other of said buttons being laterally cammed by the other boss when said cassette is reversed, the other said button urging the other plunger, reset cam, and the shaft and disk through said angle to once again close said switch whereby said camera is in position to operate upon actuation of said camera operating control to transport and expose the remainder of the film in said cassette.

7. In a motion-picture camera of the type loaded by means of a film cassette, the combination comprising:
   A. drive means for said camera including an electric motor;
   B. chamber means for receiving a film cassette having a boss;
   C. control means for said drive means including a switch in the circuit of said motor and movable between a closed position in which said drive means is in condition to operate, and a normal open position in which said drive means is disabled; and
   D. actuating means including a control cam for controlling the opening and closing of said switch, said control cam comprising a rotatable disk having a peripheral notch, and said switch including a flexible contact element having a projection urged into engagement with the periphery of said disk for opening said switch when said projection enters said notch, said actuating means further having a follower mechanism operatively controlling said disk and movable by the boss of a film cassette upon insertion of the cassette into said chamber means to move said switch to its closed position.

8. The invention according to claim 7 wherein said follower mechanism comprises a reciprocally movable element having one end engageable by said boss, and a reset cam connected to said cam disk and movable by the opposite end of said element.

9. The invention according to claim 8 wherein said opposite end of said element is flexible and engages a lug formed by said reset cam.

References Cited in the file of this patent
UNITED STATES PATENTS

| | | |
|---|---|---|
| 1,704,189 | Goldberg | Mar. 5, 1929 |
| 2,026,960 | Branch | Jan. 7, 1936 |
| 2,080,086 | Mihalyi | May 11, 1937 |
| 2,091,508 | Howell | Aug. 31, 1937 |
| 2,149,218 | Heinisch et al. | Feb. 28, 1939 |
| 2,213,768 | Merriman et al. | Sept. 3, 1940 |